United States Patent [19]

Kato

[11] Patent Number: 4,503,469
[45] Date of Patent: Mar. 5, 1985

[54] PICTURE IMAGE ENLARGING/REDUCING SYSTEM
[75] Inventor: Hiroshi Kato, Kanagawa, Japan
[73] Assignee: Fuji Xerox Co., Ltd., Tokyo, Japan
[21] Appl. No.: 459,078
[22] Filed: Jan. 19, 1983
[30] Foreign Application Priority Data Jan. 26, 1982 [JP] Japan .................................. 57-9599

[51] Int. Cl.³ .......................... H04N 1/04; H04N 1/46
[52] U.S. Cl. ........................................ 358/287; 358/77
[58] Field of Search ................ 358/287, 285, 280, 75, 358/77, 78, 903; 355/54

[56] References Cited
U.S. PATENT DOCUMENTS 4,303,948 12/1981 Arai et al. ............................ 358/287

Primary Examiner—Howard W. Britton
Assistant Examiner—Victor R. Kostak
Attorney, Agent, or Firm—Sughrue, Mion, Zinn, Macpeak and Seas

[57] ABSTRACT

In a picture image enlarging/reducing system of the type wherein image magnification by a desired factor is achieved by first enlarging the image by an integer factor greater than the desired factor and then multiplying the enlarged image by a correction coefficient corresponding to the ratio of the desired factor to the integer factor, a zero judging circuit is provided to detect whether a line or a part of a line in the picture image is all zeros. If so, the zeros are inserted into the magnified picture image signal directly in accordance with the desired magnification factor.

8 Claims, 12 Drawing Figures

PICTURE IMAGE ENLARGING/REDUCING SYSTEM

BACKGROUND OF THE INVENTION

The present invention relates to a picture image enlarging/reducing system for enlarging/reducing an original picture image by reading each picture element of the original picture image and converting the read-out result into a time series electrical signal which is then electrically processed to provide an enlarged/reduced picture image. More particularly, the invention relates to a picture image enlarging/reducing system in which the time necessary for the above-mentioned processing is reduced.

A conventional apparatus will first be described hereinafter by referring to the drawings.

FIG. 1 is a diagram showing a processing concept in which only the picture image information relating to an extracting area is extracted from a first page memory and the extracted picture image information of the extracting area is processed so as to be enlarged/reduced (hereinafter merely referred to as "enlargement") with an instructed magnifying factor and the picture image information relating to a copying area obtained by the processing is caused to be stored in a designated address of a second page memory.

In FIG. 1, a process is illustrated in which a picture image in a designated part of or the entire area (extracting area) A of an original document (or an original picture image on the original document) a is enlarged by an instructed magnifying factor x and the enlarged picture image is caused to be recorded onto a designated position or area (copying area) B on a copy sheet to obtain a copy of the picture image (or a copy sheet on which the copy of the picture image has been recorded) b.

A conventional picture image enlarging/reducing system used in the picture image processing means according to the present invention will be first described.

Generally, there is an infinite number of possible magnifying factors, e.g., 0.05, 0.13, 1.05, 4.87, 5.99, etc. Even if the interval of adjacent factors is limited to 0.05, there are still an infinite number of magnifying factors, e.g., 0.05, 0.10, ..., 5.25, ..., 9.05, .... Further, there are about 80 magnifying factors even if they are limited to below 4.00 with an interval of 0.05. Accordingly, there is a problem as to how to reduce the number of the magnifying factors.

The following is a basic expression for reducing the number of magnifying factors. With respect to a magnifying factor x larger than 1.0, an expression can be given, generally, as follows:

$$x = ([x] + \beta) \cdot \alpha,$$

therefore $$\alpha = x/([x] + \beta)$$

where $\alpha$ is a correction coefficient, $[x]$ is an integral part, i.e., a maximum integer not larger than x, and $\beta$ is a natural number. Since it is advantageous in terms of probabilities to select the value of $[x]+\beta$ to be small in order to make an enlarged picture image as true as possible to the original picture, the above-mentioned expression is as follows when $\beta = 1$;

$$x = ([x] + 1) \cdot \alpha$$

$$\therefore \alpha = x/([x]+1)$$

For example, with respect to $x = 3.33$, $[x] = 3$ and therefore $$3.33 = 4 \cdot \alpha$$

$$\therefore \alpha = 0.8325.$$

That is, to multiply a value by 3.33 is equivalent to multiplying first by 4 and then by 0.8325. Here, the process of multiplying by the decimal number $\alpha$ may be a problem, while the process of multiplying by an integer can be conventionally effected.

The value of $\alpha$ is given as follows:
When $0 < x < 1$, $\alpha = x$ and $0 < \alpha < 1$;
When $1 < x < 2$, $\alpha = x/2$ and $\frac{1}{2} < \alpha < 1$; and
When $n < x < n+1$, $\alpha = x/(n+1)$ and $n/(n+1) < \alpha < 1$.

This state is illustrated in FIG. 3. As seen in the drawing, if the values of x are taken at equal intervals, it is necessary to make the intervals of the values of $\alpha$ smaller in the vicinity of the $\alpha$ value of 1, while if the values of $\alpha$ are taken at equal intervals, the magnifying factor will necessarily be selected more roughly as the value of x becomes larger. When determining the values of x and $\alpha$, it is necessary to pay attention to this point.

In a normal mode of operation, since the magnifying factor x is naturally determined within a certain region, it is convenient to determine the correction coefficient based on the magnifying factor. For example, assuming that the value of x is within a region below 4 and it will be sufficient to vary the magnifying factor at an interval of about 0.2, it is apparent that the minimum interval of the values of correction coefficient $\alpha$ may be about 0.05.

Accordingly, the case will be described hereunder in which $\alpha$ takes 18 values of 0.05, 0.10, ..., 0.90, and 0.95. The $\alpha$ used for reducing processing takes a value within a range of 0.05-0.95 and that used for enlarging processing takes a value within a range of 0.5-0.95. When the magnifying factor x is less than 1, $\alpha$ is in the range between 0.05 and 0.95 and reducing processing is carried out. On the other hand, when x is equal to or greater than 1, $\alpha$ cannot be less than 0.45. Accordingly, when $x = 1$, $\alpha$ becomes 0.50 and $\alpha$ is between 0.50 and 0.95 for $x > 1$, and enlargement processing is performed with $\alpha$ between 0.50 and 0.95. As described later, the processing is such that, for $0.05 \leq \alpha \leq 0.45$, a small number of data are sampled and extracted out of a large number of data, and for $0.5 \leq 0.95$, a small number of data are thinned to be omitted from a large number of data in the range of $\alpha = 0.5-0.95$. The reason for this is that, e.g. in the case of a 20:1 reduction, it is easier to select the one bit out of 20 to be used rather than to select the 19 bits to be discarded, and in the case of a 20:19 reduction, it is easier to select the one bit to be thinned. Accordingly, both the processes are similar to each other in that a small number of data are selected from among a large number of data, so that it is possible to change the method in one process into the other process. That is, for example, if it is possible to effect the processing for $\alpha = 0.05$, it is also possible to effect the processing for $\alpha = 1 - (0.05) = 0.95$. Therefore, only the processing for $\alpha = 0.05-0.5$ will be described in this specification.

The selected values of $\alpha$ are expressed in the form of an integral ratio A:B as follows:

| | | | |
|---|---|---|---|
| 0.05 | 20:1 | 0.30 | 10:3 |
| 0.10 | 10:1 | 0.35 | 20:7 |
| 0.15 | 20:3 | 0.40 | 5:2 |
| 0.20 | 5:1 | 0.45 | 20:9 |
| 0.25 | 4:1 | 0.50 | 2:1 |

Each of the integral ratios means that B bits are selected out of A bits of linearly arrayed data so that only the selected data are taken out to be used in the sampling processing while the selected data are removed to be discarded in the thinning processing. That is, for example, in the case of the ratio (4:1), any one of four linearly arrayed bits a–d is selected to be used in the sampling processing, while in the thinning processing the selected bit is to be removed so as to produce any one of the combinations of the remaining three bits, i.e., abc, abd, acd or bcd.

Next, patterns A and B are prepared for each of the above-mentioned values of $\alpha$, in the manner as follows:

Each pattern means that when $\alpha$ takes a value not larger than 0.5, the data located at a position of "1" is extracted by sampling while when it takes a value not smaller than 0.5 the data located at the same position is removed by thinning.

Further, a mark $\Gamma$ represents the number of "0"s located between two adjacent "1"s when the two patterns are linearly arrayed, for example $\Gamma_{AB}$ represents the number of "0"s located between two adjacent "1"s when the pattern B is arrayed next to the pattern A.

| | | |
|---|---|---|
| $\alpha$ = 0.25, 0.75 (4:1) | | |
| A = 0100 | $\Gamma_{AA} = \Gamma_{BB} = 3$ | average |
| B = 0010 | $\Gamma_{AB} = 4, \Gamma_{BA} = 2$ | $\Gamma = 3$ |
| $\alpha$ = 0.20, 0.80 (5:1) | | |
| A = 00100 | $\Gamma_{AA} = \Gamma_{BB} = 4$ | average |
| B = 01000 | $\Gamma_{AB} = 3, \Gamma_{BA} = 5$ | $\Gamma = 4$ |
| $\alpha$ = 0.40, 0.60 (5:2) | | |
| A = 01010 | $\Gamma_{AA} = \Gamma_{BB} = 2$ | average |
| B = 10010 | $\Gamma_{AB} = \Gamma_{BA} = 1$ | $\Gamma = 1.5$ |
| $\alpha$ = 0.10, 0.90 (10:1) | | |
| A = 0000100000 | $\Gamma_{AA} = \Gamma_{BB} = 9$ | average |
| B = 0000010000 | $\Gamma_{AB} = 10, \Gamma_{BA} = 8$ | $\Gamma = 9$ |
| $\alpha$ = 0.30, 0.70 (10:3) | | |
| A = 0100100100 | $\Gamma_{AA} = \Gamma_{AB} = 3$ | average |
| B = 0100010010 | $\Gamma_{BB} = \Gamma_{BA} = 2$ | $\Gamma = 2.3$ |
| $\alpha$ = 0.05, 0.95 (20:1) | | |
| A = 00000000010000000000 | $\Gamma_{AA} = \Gamma_{BB} = 19$ | average |
| B = 00000000001000000000 | $\Gamma_{AB} = 20, \Gamma_{BA} = 18$ | $\Gamma = 19$ |
| $\alpha$ = 0.15, 0.85 (20:3) | | |
| A = 00010000001000000100 | $\Gamma_{AA} = \Gamma_{BB} = 5$ | average |
| B = 00100000010000001000 | $\Gamma_{AB} = 4, \Gamma_{BA} = 6$ | $\Gamma = 5.90$ |
| $\alpha$ = 0.35, 0.65 (20:7) | | |
| A = 01001001010010010010 | $\Gamma_{AA} = \Gamma_{BB} = 2$ | average |
| B = 01001001001010010010 | $\Gamma_{AB} = \Gamma_{BA} = 2$ | $\Gamma = 1.875$ |
| $\alpha$ = 0.45, 0.55 (20:9) | | |
| A = 01010101001010101010 | $\Gamma_{AA} = \Gamma_{BB} = $ | average |
| B = 01010101010010101010 | $\Gamma_{AB} = \Gamma_{BA} = 2$ | $\Gamma = 1.3$ |
| $\alpha$ = 0.50 (2:1) | | |
| A = 01 | $\Gamma_{AA} = \Gamma_{BB} = 1$ | average |
| B = 10 | $\Gamma_{AB} = 0, \Gamma_{BA} = 2$ | $\Gamma = 1.0$ |

In the above table, $\Gamma$ average is calculated taking into account the interior of a pattern and the boundary between adjacent patterns and is generally given by the formula $\Gamma_{average} = (x - y + z)/(y + 1)$, where $\alpha$ is expressed in terms of x:y and z is the average of $\Gamma_{AA}$, $\Gamma_{AB}$, $\Gamma_{BA}$, and $\Gamma_{BB}$.

As will be apparent from the above-mentioned relationships, the correction coefficient is substantially equivalent to the percentage of each of the patterns A and B or the combination of the patterns A and B which are "1". Accordingly, the repetition arrangement of each of the patterns A and B or the combination of them may be used as the correction coefficient. Mere repetition of only the pattern A or B or simple repetition of the combination of the patterns A and B is apt to produce a moire pattern and therefore it is preferable to arrange the patterns A and B at random to prevent a moire stripe from occurring.

Next, the process for multiplying by 2.22 will be described by way of example. Since $x = 2.22 = 3 \times 2.22/3 = 3 \times 0.74$, the correction coefficient $\alpha$ is 0.74. That is, it will be sufficient to enlarge first with a magnifying factor 3 and then reduce with a magnifying factor 0.74. Since the value of $\alpha$ may be approximated as $\alpha = 0.74 \simeq 0.75$ and $\alpha = 0.75 = 15/20 = \frac{3}{4}$, it will be sufficient to thin one bit from four bits.

An example of the processing in one direction will be described next. Assuming that the patterns A = 0100 and B = 0010 and the thinning instruction $\overline{AB}$ is the order of ABAB . . . , the $\overline{AB}$ is as follows:

... 01000100100001001000010010000100 ...

Further, the data multiplied by 3 is as follows if the picture image is . . . 0011001110 . . . :

... 000000111111000000111111111000 ...

The thinning instructions of $\overline{AB}$ and the data multiplied by 3 are correspondingly described as follows:

| | |
|---|---|
| $\overline{AB}$ | ...01000100100001001000010001000010... |
| 3 times DATA | ...000000111111000000111111111000 * * * * * * * |

By thinning the bits indicated by the mark * in the data multiplied by 3, the data multiplied by 2.22 can be obtained as follows:

| | |
|---|---|
| 2.22- times DATA | ...000001111000011111111000... |

In this case, exactly speaking, the magnifying factor is 23 bits/10 bits = 2.3. Two dimensional processing can be made by effecting the processing also in the other direction in a manner similar to that mentioned above (although there are methods in which the thinning is made by line and by bit, respectively).

Referring to the block diagram of FIG. 2, the configuration and the operation thereof will be described. In the drawing, the reference numerals 1 and 2 designate a first and a second page memory respectively. Assume that the picture image is stored in the successive addresses of each of the first and second memories from the leading address, in the order of being scanned with respect to each picture element of the picture image.

On the original and copy picture images, scanning is performed including the main scanning of the picture element train constituted by M′ picture elements arranged in the direction indicated by an arrow c in FIG. 1, with the information of the respective picture elements being successively inputted/outputted from left to right, and the subscanning in which the picture element train to be subjected to the main scanning is successively shifted in the direction indicated by an arrow d.

The input/output operation to/from each page memory is effected k bits at a time and an information unit of a k bit is referred to as one "word". The reference numerals 503 and 504 denote address designating circuits for designating addresses of the first and second page memories respectively.

The address designating circuit 503 has a configuration as shown in the block diagram of FIG. 4. In the drawing, the reference numerals 601, 602, 603 and 604 denote registers, 605 and 606 denote counters, 607 and 608 denote comparators, 609 denotes, an adder, 610 denotes a multiplier, and 611 and 612 denote OR circuits. The contents stored in the registers 601, 602, 603 and 604 are ap, m, n and M respectively.

The mark "ap" represents the information with respect to the picture element P located at the upper left-most position in the extracting A shown in FIG. 1 and the address at which k pieces of information (a k-bit word) are stored or from which the information is read in the page memory simultaneously with the first mentioned information with respect to the picture element P.

The mark m represents the number of times an address is designated for inputting/outputting, k bits at a time, the information with respect to the m picture elements arranged in the direction indicated by the arrow c in the extracting area A.

The mark n represents the number of picture elements arranged in the direction indicated by the arrow d in the extracting area A and the mark M represents the number of times an address is designated for inputting/outputting the k-bit words of information with respect to the m picture elements arranged in the direction indicated by the arrow c.

Accordingly, the address designating circuit 503 operates in the manner as described hereunder and is externally supplied with signals for effecting such an operation.

In FIG. 4, each of the counters 605 and 606 is initially set to display zero in response to a start pulse signal a supplied by a control circuit 523 (FIG. 2). Accordingly, the operational result of the multiplier 610 is also zero and the output g of the adder 609 is "ap" equal to the output of the register 601.

Accordingly, the address is designated for one word of information including the information of the picture element P in the extracting area A. Subsequently, the counter 605 is supplied with a clock pulse b so that it counts and produces the number of the received clock pulse, whereby the address designated by the output of the adder 609 is successively increased by one from "ap" to "$a_p+1$", "$a_p+2$", . . . .

Since the count of the counter 605 coincides with the content of the register 602 when it has received the m-th clock pulse, the comparator 607 produces a pulse signal. This pulse signal is referred to as an EOL (end of line) signal and indicates the completion of address designations necessary for reading from the page memory 1 the information with respect to the m picture elements arranged in the main scanning direction (the direction indicated by the arrow c in FIG. 1) in the extracting area A.

This EOL signal is provided externally as an output signal e and at the same time the EOL signal is supplied to the input of the OR circuit 611 so that the counter 605 is reset to zero again.

In the case where no signal C is supplied when the EOL signal is generated, the content of each of the counter 606 and the multiplier 610 does not change and therefore the address designated by the output signal g is "ap". Accordingly, the address designated by the subsequent clock pulse b is exactly the same as that designated with respect to the picture element train read out immediately before.

In the case where the input pulse signal c is supplied simultaneously with the generation of the EOL signal, the value of the counter 606 increases by one so as to cause the output of the multiplier 610 to change from zero to M. That is, the output value of the multiplier is increased by M every time the count of the counter 606 increases by one.

Accordingly, the address designated by the output signal g at this time is "ap+M" and it is the address of the page memory 1 at which one K-bit word of information with respect to the picture element located directly under the picture element P is stored, as will be apparent from FIG. 1.

Subsequently, in response to the clock pulses successively supplied to the counter 605, the designated address successively changes from "ap+M" to "ap+M+1", "ap+M+2", . . . , so that the information is read out for a picture element train adjacent in the subscanning direction to the picture element train previously read out and constituted by m picture elements.

As will be apparent from the previous description, in the case where the pulse signal c is supplied when the EOL signal is generated from the comparator 607, the picture element train relating to the information subsequently read out of the page memory 1 advances by one picture element in the subscanning direction from the picture element train relating to the information read out immediately before from the same page memory 1, while in the case where no signal c is supplied, the same addresses are designated as were designated during read out of the immediately prior picture element train.

During subsequent repetitions of the operations mentioned above, the addresses at which the picture image information is stored with respect to the entire extracting area A are successively designated.

When the n-th pulse signal is supplied to the counter 606, the count of the counter 606 coincides with the setting of the register 603 so that the comparator 608 produces a pulse signal. This pulse signal is hereinafter referred to as an "END signal" which indicates completion of the entire reading operation of the picture image information with respect to the extracting area A out of the picture image information with respect to the extracting area A out of the page memory 1. The END signal is provided externally as a signal f meaning that all the read-out picture image information has been processed and stored in the addresses relating to the copy area of the second page memory 2.

The address designating circuit 504 has a configuration as shown in FIG. 5. As is apparent, this circuit 504 is nothing but the address designating circuit 503 of FIG. 4 in which the registers 602 and 603 and the comparators 607 and 608 have been eliminated and therefore the output signals e and f do not exist. The reference numerals 701 and 704 denote registers respectively storing "$a_q$" and "$M_f$", 705 and 706 denote counters, 709 denotes an adder, 710 denotes a multiplier, and 711 denotes an OR circuit. These devices operate in the manner as described hereunder.

Being supplied with a start pulse signal a, each of the counters 705 and 706 is initially set to zero. Accordingly, the operational result of the multiplier 710 is also zero and the output of the adder 709 is "$a_q$" equal to that of the register 701.

The mark "$a_q$" represents the address for storing one word of picture image information including the picture image Q located at the upper leftmost point in the copy area B shown in FIG. 1, and the first produced address designating signal g has this value "$a_q$".

Subsequently, as the counter 705 counts the successively supplied clock pulses b, the value of the output signal g successively increases from "$a_q$" to "$a_q+1$", "$a_q+2$", ..., similarly to the cae of FIG. 2. This increase is continued until the EOL signal e is supplied to the OR circuit 711, and the output value of the counter 705 becomes zero again in response to the EOL signal.

If the pulse signal c is supplied at this time, the output of the counter 706 changes from zero to one (1) and, in response to this change, the output of the multiplier 710 changes from zero to "$M_1$".

The mark "$M_1$" represents the number of times an address is designated for inputting, k bits at a time (namely by word), the information with respect to the $M_1$ number of picture elements arranged in the main scanning direction in the copy picture image, and therefore $M=M_1$ when the respective arrangements constituting the original and copy picture images are the same as each other. Accordingly, the address designated by the output signal g becomes "$a_q+M_1$" and corresponds to the address into which one word of information is written which constitutes the information with respect to the picture element located directly under the picture element Q in FIG. 1. Thus, the addresses "$a_q+M_1+1$", "$a_q+M_1+2$", ... successively designated in response to the subsequently supplied clock pulses b relate to the picture element train which is advanced in the subscanning direction by one picture element from the picture element train written immediately before.

Subsequently, the above-mentioned operation is repeated until the addresses have been designated with respect to all the copy areas.

The picture image processing means shown in the block diagram in FIG. 2 is arranged so as to achieve a series of operations including the steps of extracting only the picture image information relating to the extracting area of the first page memory, processing the extracted information to enlarge the picture image relating to the extracting area with a magnifying factor x and storing the thus processed picture image information in the addresses relating to the copy area of the second page memory 2, the picture image processing including the steps of enlarging first the picture image relating to the extracting area with a magnifying factor X' and then reducing the enlarged picture image with a magnifying factor $\alpha$ to obtain the desired picture image enlarged with the magnifying factor x.

The operation of the picture image processing means of FIG. 2 will be described hereunder.

When a start pulse signal 302 instructing the start of the series of operations is produced from the control circuit 523, the address designating circuits 503 and 504 designate the addresses "$a_p$" and "$a_q$", respectively, as described above. Further, in response to this start signal, each of frequency dividers 510, 511, 512 and 513 is initially set to zero.

The frequency dividers 510 to 513 count subsequently inputted pulses and come back to their initial states in response to the reception of the X-th, KX-th, X-th and K-th pulse, respectively, and subsequently repeat the above operation in response to the input pulses. Further, the frequency dividers 510, 511, 512 and 513 are arranged so as to produce output pulse signals in response to the reception of the k-th, the KX-th, the X-th and K-th input pulse, respectively.

The start signal 302 is supplied also to a shift register 505 through an OR circuit 514 and a delay circuit 522 to cause the shift register 505 to take in the one word of information indicated at the data gate of the page memory 1. The shift register 505 is of the K-bits parallel-in-serial-out type, and the information inputted at this time consists of the one word (K bits) of information stored in the address "ap" designated by the address designating circuit 503.

Under these conditions, thereafter, clock pulses 301 are successively sent out from the control circuit 523. The clock pulses 301 are successively supplied to the frequency divider 510 which supplies a 1/x frequency-divided pulse train (hereinafter referred to as a first shift signal) 305 to the shift register 505 and to a flip-flop 507.

The shift register 505 sends out the picture image information to the flip-flop 507 one bit at a time each time it is supplied with the shift signal 305, and the flip-flop 507 changes the state of its output gate Q in accordance with the received picture image information, this state of the output gate Q being held until the next shift signal 305 is supplied.

The picture image information indicated at the output gate Q of the flip-flop 507 is further transferred to a shift register 506. The shift register 506 is of the K-bits serial-in-parallel-out type and receives and stores the state appearing at the output gate Q of the flip-flop 507 as one bit of information every time it is supplied with a pulse signal (hereinafter referred to as a second shift signal) 309. The second shift signal 309 is obtained by delaying the clock pulse 301 through a delay circuit 519 and then gating the delayed clock pulses by AND circuits 517 and 518, the other inputs of the AND circuits 517 and 518 being supplied with the outputs of shift registers 508 and 509 respectively.

Reducing information corresponding to the correction coefficient $\alpha$ has been previously stored in each of the shift registers 508 and 509. Further, the contents of the respective shift registers 508 and 509 may or may not be the same as each other. The reducing information is composed of a pattern obtained in such a manner that two or more different reducing patterns determined with respect to the correction coefficient $\alpha$ for the sampling/thinng are prepared and arranged irregularly (for example, the above-mentioned patterns A and B may be continued in a suitable order).

The shift registers 508 and 509 are arranged such that the information produced therefrom in response to their respective pulse signals are inputted again to the same registers 508 and 509 to be stored therein. Thus, the state of the output gate of each of the shift registers 508 and 509 circulates and it is preferable to select the capacity of each shift register to be large enough so that the regularity caused by the circulation in sampling/thinning will be negligible.

Since the clock pulse 301 produced by the control circuit 523 is supplied to the AND circuit 517 through the delay circuit 519 as well as to the shift register 508, a pulse train 308 produced from the AND circuit 517 is equivalent to that obtained by sampling/thinning the clock pulses 301 in accordance with the correction coefficient $\alpha$.

The shift register 509 is supplied with the EOL signal e produced from the address designating circuit 503 and changes its output state in accordance with the previously stored reducing information each time it receives the EOL signal. Accordingly, if the output state of the shift register 509 is low, the pulse train 308 will not be passed through the AND circuit 518 and the picture image information indicated at the output gate Q of the flip-flop 507 is not stored in the shift register 506. Alternatively, if the output state of the shift register 509 is high, the pulse tran 308 passes through the AND circuit 518 as the second shift signal 309 so as to cause the shift register 506 to store the signal at the output Q of the flip-flop 507 as picture image information.

As described above, the EOL signal supplied to the shift register 509 represents the completion of the address designations necessary for reading out, from the page memory 1, the information with respect to the m picture elements arranged in the main scanning direction in the extracting area A shown in FIG. 1, and therefore the output state of the shift register 509 does not change during the processing of the information with respect to one picture element train in the above-mentioned extracting area. Accordingly, when the output of the shift register 509 is in its high level, the number of pulses of the second shift signal 309 supplied to the shift register 506 is the same as that obtained by multiplying by X the number of pulses of the first shift signal 305 supplied to the shift register 505 and the flip-flop 507 and then sampling or thinning in accordance with the reducing information corresponding to the correction coefficient $\alpha$.

Accordingly, the information stored in the shift register 506 represents the picture image which is obtained by multiplexing by x ($=X\cdot\alpha$) in the main scanning direction the picture image with respect to the information read out of the first page memory 1.

The picture image information stored in the shift register 506 is transferred one word (k bits) at a time to the second page memory 2 and is stored in the page memory 2 at addresses designated by the address designating circuit 504. This is achieved in a manner such that the frequency divider 513 for counting the number of pulses of the second shift signal 309 produces a pulse signal every time its count reaches k so as to enable the write mode of the second page memory 2 to store the K parallel bits from the register 506 and the pulse signal produced by the frequency divider 513 is also supplied as an input signal b to the address designating circuit 504 through a delay circuit 520 so as to cause the address designating circuit 504 to designate the address into which writing is effected next.

The address designating circuit 503 designates the address from which the information is read next, in response to the application of a pulse signal 304 produced by the frequency divider 511 to the input b of the address designating circuit 503. The frequency divider 511 counts the clock pulses 301, as described above, and produces the pulse signal 304 every time its count reaches the value k·X. Thus, the address designating circuit 503 changes the designated address every time the count in frequency divider 511 reaches the value k·X. The pulse signal 304 is supplied also to the shift register 505 through the OR circuit 514 and the delay circuit 522 so as to cause the shift register to take in the one word of information relating to the address designated by the address designating circuit 503. The information stored in the shift register 505 is processed in the manner described above.

When the information with respect to the first picture element train in the main scanning direction in the extracting area A shown in FIG. 1 is entirely read out in accordance with the above-mentioned procedure, the EOL signal is produced from the address designating circuit 503. The EOL signal is supplied to the OR circuit 611 of the address designating circuit 503 as well as the frequency divider 512, and the output of the frequency divider 512 is supplied as the input signal c to the counter 606 of the address designating circuit 503. As a result, as described above, the address designating circuit 503 reads out, X-times each, the m picture elements arranged in the main scanning direction in the extracting area A shown in FIG. 1 (that is, the original picture image is multiplied by X in the main scanning direction).

Accordingly, for the first (X-1) EOL signals, no output c is provided by the divider 512 to the circuit 503 in FIG. 4, and the picture element train which is the same as the immediately prior information is read out. When the X-th EOL signal occurs, a picture element train advanced by one picture element in the subscanning direction from the first mentioned picture element train is read out thereafter.

The EOL signal is applied through an OR circuit 515 to the frequency divider 513 to initially set it as well as to the address designating circuit 504 as the input signal e and as the input signal c through a delay circuit 521 and an AND circuit 516. The other input of the AND circuit 516 is supplied with the output of the shift register 509. As already described, the shift register 509 changes its output state in accordance with the correction coefficient $\alpha$ stored therein every time it is supplied with the EOL signal.

Accordingly, when the output state of the shift register 509 generated in response to the EOL signal is high, the EOL signal is supplied to the address designating circuit 504 as the input signal c thereto. Therefore, the address designated thereafter by the address designating circuit 504 relates to the picture element train advanced in the subscanning direction by one element from the train picture element written immediately before.

When the output state of the shift register 509 is low, the input signal c is not supplied and the address designating circuit 504 is set so that the picture element train written immediately before is designated again. However, the AND circuit 518 stops sending out the second shift signal 309 and therefore the information of the picture element train presently read out of the first page memory 1 is not written into the second page memory 2.

That is, the information with respect to each picture element train arranged in the main scanning direction in the extracting area A is repeatedly read out X-times and the lines corresponding to the correction coefficient $\alpha$ are sampled or thinned so that the picture image with respect to the extracting area A is multiplied by x ($=X\cdot\alpha$), in the subscanning direction the picture elements being further sampled or thinned in each of the picture element trains in the main scanning lines constituting the picture image multiplied by x in accordance with the reducing information corresponding to the correction coefficient α.

It has been apparent that the information representing the picture image, obtained by multiplying by x the picture image with respect to the extracting area in the original picture image, is stored in the second page memory 2 corresponding to the copy area in the second page memory 2 by repeatedly performing the above-mentioned operations.

The ending of the operations is indicated by the END signal f sent out of the address designating circuit 503. The END signal f has been already described in detail above. Receiving the END signal f, the control circuit 523 causes the clock pulse 301 to stop so that a series of operations are completed.

Although the description has been made with respect to the case of enlargement, that is the case where the magnifying factor is larger than one (1), it is apparent that in the case of reduction where the magnifying factor is smaller than one (1), [x] is zero and therefore it will be sufficient to effect the sampling or thinning operation directly with respect to the information of the original picture image in the first page memory 1 in accordance with the correction coefficient α.

In the conventional system as described above, and as is apparent from the above description, a reducing pattern is utilized for every original picture image (including an enlarged picture image). In many cases, it is not efficient to utilize a reducing pattern to reduce every original picture image and there is a drawback that processing time increases.

Further, in the above-mentioned conventional case, although a moire stripe may be prevented from occurring by arranging patterns A and B at random, it is necessary to use many of the patterns A and B for this purpose. There is a further disadvantage, therefore, that the correction coefficient to be inputted into the shift registers 508 and 509 in FIG. 2, and consequently the shift registers themselves, are required to have a large number of bits.

SUMMARY OF THE INVENTION

It is therefore an object of the present invention to solve the above-described problems in the prior art.

It is another object of the present invention to provide a picture image enlarging/reducing system in which the processing is speeded up to reduce the processing time.

It is a further object of the present invention to provide a picture image enlarging/reducing system in which a moire stripe can be prevented from occurring even if a short correction coefficient is used.

Briefly, these and other objects of the invention are achieved by examining the original picture image information to determine whether or not a predetermined number of words in the main scanning direction on any given line are all zero. If an all-zero state is not detected, the original picture image is first enlarged by a magnifying factor obtained by adding a predetermined integer to the integer part of a desired magnifying factor, the enlarged picture subsequently being reduced by the ratio of the desired magnifying factor to the summed natural number. When the examination of the original picture image information indicates an all-zero condition, the conventional enlarging/reducing process is not employed but the original picture image is directly enlarged or reduced in accordance with the desired magnifying factor, thereby enhancing the processing speed.

Further, due to the irregularity in employing the enlarging/reducing process, the correction coefficient α can be made to appear irregular even though it may have a relatively small number of bits, thus avoiding the occurrence of a moire stripe.

DETAILED DESCRIPTION OF THE PREFERRED EMBODIMENT

Figure 1:
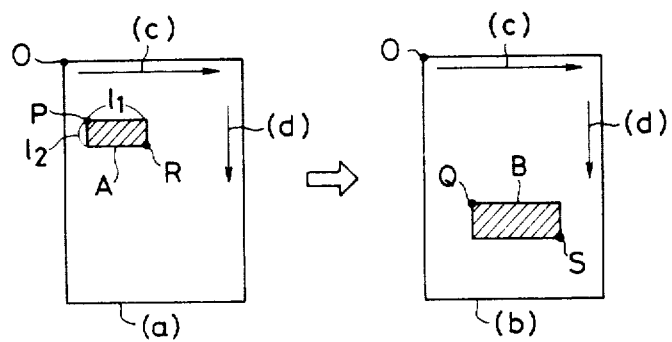
FIG. 1 is a diagram illustrating picture image enlargement according to the prior art and the present invention.
Figure 2:
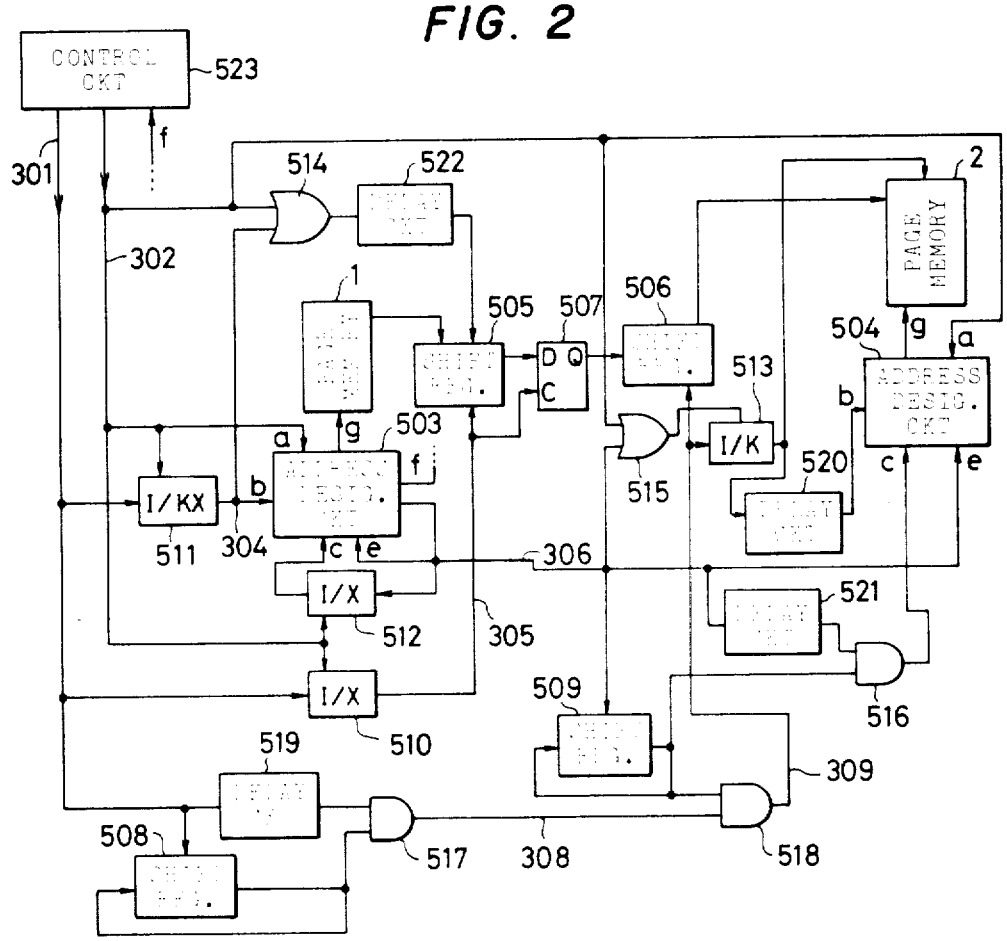
FIG. 2 is a block diagram illustrating the conventional picture image enlarging/reducing system.
Figure 3:
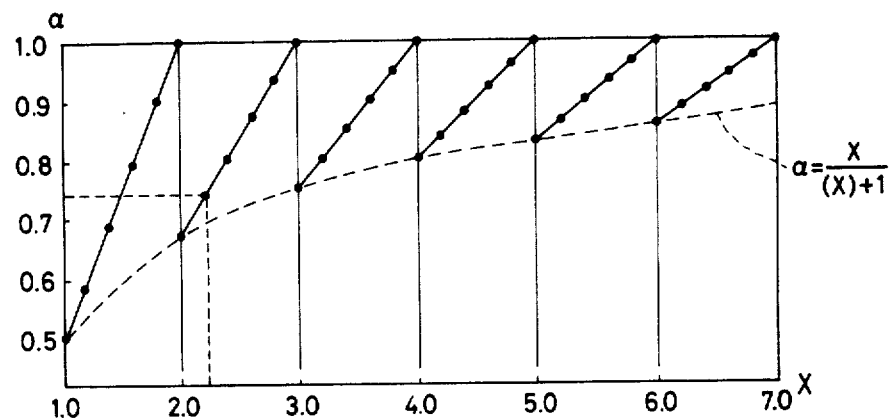
FIG. 3 is a diagram for explaining the principle of picture image enlargement/reduction.
Figure 6:
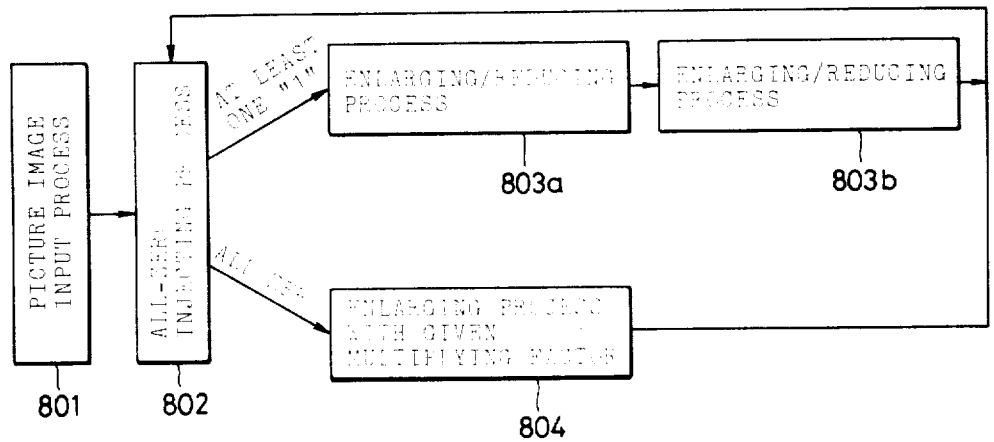
FIG. 6 is a block diagram for briefly explaining the principle of the present invention.

The principle of the present invention will be first described. FIG. 6 is a schematic diagram illustrating the picture image enlarging/reducing process according to the present invention, FIG. 7 is for more particularly explaining the picture image enlarging/reducing process of FIG. 6, and FIG. 8 shows the state of data stored in the first and second page memories 1 and 2 (FIG. 2).

The present invention will be first briefly explained by referring to FIG. 6. First, in a picture image input process 801, only the picture image information with respect to the extracting area of the first page memory is extracted, e.g. several bits at a time similarly to the conventional case. The extracted information may then be inputted into a memory. The extracted picture image information is examined in an all-zero judging process 802 to determine whether or not a predetermined number of bits of the extracted picture image information are all zero.

Figure 7:
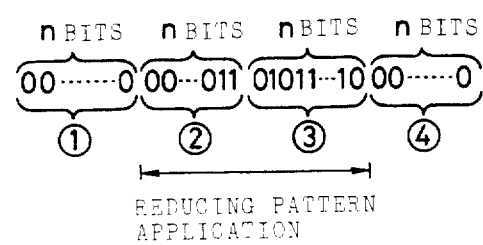
FIG. 7 is a diagram for explaining the all-zero judging process of FIG. 6.
Figure 8:
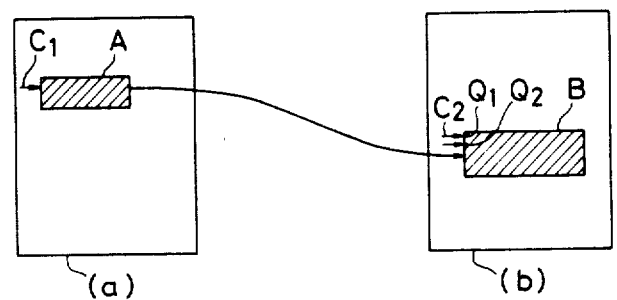
FIG. 8 is a diagram for illustrating an example of picture image enlargement at all-zero.

Assume now that the picture image information extracted out of the first memory 1 (hereinafter referred to as an original picture image) has the following configuration as shown in FIG. 7:

| n bits | n bits | n bits | n bits |
|--------|--------|--------|--------|
| 00....0 | 00....011 | 01011...10 | 00....0 |

Then, the extracted original image information is examined n bits at a time to determine whether each group of n bits are all zero or not in the all-zero judging process 802 as shown in FIG. 7. When the judgement result indicates all-zero, the operation is advanced to a given magnifying factor enlarging process 804. In the process 804, "0"s determined in accordance with the magnifying factor are written into an output area B. Alternatively, as shown in FIG. 8, when the output area B of the second page memory 2 is arranged such that the initial data are all zero, that is when the output area B is zero-initialized, it is sufficient to actuate only a current pointer $C_2$ of the output area B. For example, when the current point $C_2$ of the output area B is at a position $Q_1$ in FIG. 8, the current pointer $C_2$ is shifted from the position $Q_1$ to $Q_2$ so that the next picture image information is written beginning with the position $Q_2$.

On the other hand, in the case where the judgment is made in the all-zero judging process 802 that at least one "1" exists in the n bits of the original picture as shown in the block 2 in FIG. 7, the operation is advanced to an enlarging/reducing process 803a at the time the "1" is detected, in the same manner as in the conventional technique.

Generally, when an original document is read after a signal representing a letter, a picture, etc., has been detected, information of the letter, picture, etc. is often then successively detected. According to the present invention, therefore, when n bits of picture image information including a "1" is detected as in the block 2 in FIG. 7, the operation does not come back to the all-zero judging process in the next n-bit block 3 and is compelled to achieve an enlarging/reducing process 803b. The number of times of forced repetition of the enlarging/reducing process is not restricted to once as described above, but the forced repetition of the enlarging/reducing process may be made k (k being a positive integer) times including the case of the first n-bit block in which "1" is detected. In the above example, k is selected to be two.

As aforementioned, it is possible to accomplish enlargement by a given multiplying factor by writing into the output area a number of "0"s determined in accordance with the given magnifying factor, or by merely shifting the current pointer without achieving enlarging-reducing processes, resulting in reduction in processing time.

Figure 9:
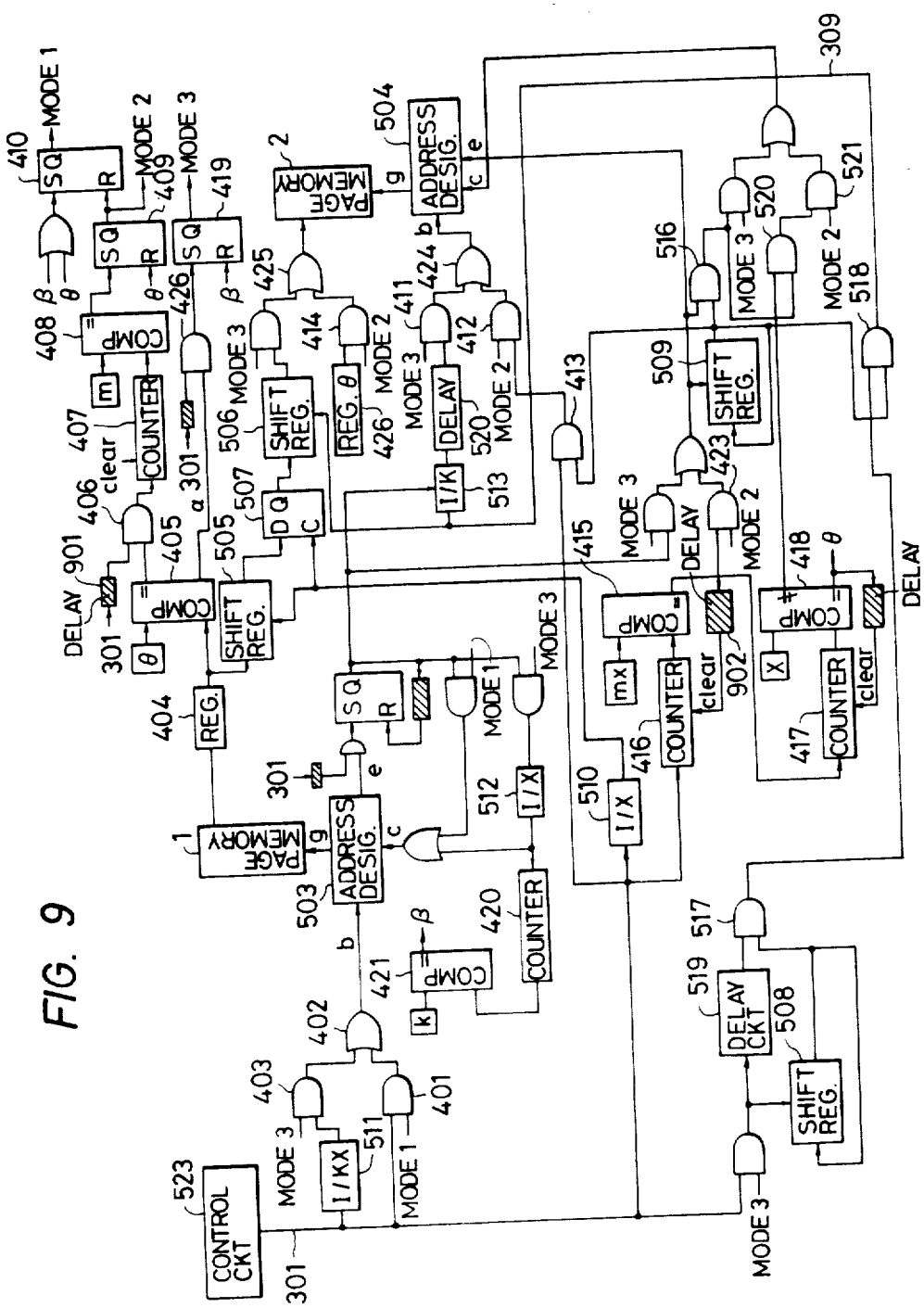
FIG. 9 is a block diagram of an embodiment of the present invention.

According to the present invention, an all-zero judging function and a function to achieve enlargement by a given magnifying factor when the judgment indicates all-zero are added into the conventional system shown in FIG. 2 and an embodiment thereof is shown in FIG. 9. In FIG. 9, the same numerals denote the same elements or parts as those in FIG. 2. The start signal 302, the line for transferring this signal 302, the terminal for receiving the signal 302, etc. of FIG. 2 are omitted in FIG. 9. It is assumed, therefore, that devices such as counters and flip-flops which require initializing are initialized when the operation starts.

At the same time as the commencement of operation, since the start signal 302 is applied to the S terminal of the flip-flop 410 through a not-shown line, the circuit is in MODE 1, which is a checking mode, in the initial state. Thus, the MODE 1 (checking mode) now takes a logic "1" and each of the MODE 2 (zero-detecting mode) and MODE 3 (enlarging/reducing mode) takes a logic "0". Since the MODE 1 is selected at the commencement of operation, the basic clock 301 is supplied to the address designating circuit 503 through an AND circuit 401 and an OR circuit 402. When the basic clock 301 is taken into the address designating circuit 503 through its terminal b, a certain address of original picture image data is sent as the address designating signal g to the first page memory 1, as described in detail with respect to the conventional case, and the data content of the designated address is read out into a register 404. The data content read out is of one word and is composed of k bits.

The k bits of data inputted to the register 404 are then transferred to the comparator 405 so that the k bits of data are judged therein as to whether they are all-zero or not. If an all-zero state is detected, the "=" terminal of the comparator 405 is turned on and a logic "1" signal is applied to one input terminal of an AND circuit 406. Since the clock pulse 301 is applied to the other terminal of the AND circuit 406 at a time delayed by a value set in a delay circuit 901 with respect to the timing of the input to the terminal b of the address designating circuit 503, this delayed clock pulse 301 enters a counter 407 through the AND circuit 406 so as to increase the count of the counter 407. A comparator 408 monitors the counter output to detect when the count of the counter 407 reaches a value m equal to the number of words of one line in the main scanning direction. When the value m is reached, the comparator 408 produces "1" signal from its "=" terminal so as to set a flip-flop 409. As a result, the Q output of the flip-flop 409 is "1", while the Q output of a flip-flop 410 is "0". That is, the mode is changed over from the MODE 1 to the MODE 2.

Since each of the MODE 1 and MODE 3 signals are "0" when the mode has been changed to Mode 1, the clock pulse 301 is blocked by the AND circuit 401 and an AND circuit 403 and therefore cannot reach the address designating circuit 503. The gate of each of AND circuits 412 and 414, which has been so far closed when the MODE 1 signal has been "1", is opened at this time.

The signal provided to one input terminal of an AND circuit 413, that is the output of the shift register 509, is alternatively made "1" and "0" in accordance with the output of register 509 which is clocked at a rate at which one line of output picture image is written into the second page memory 2. Assuming now that the magnifying factor given by the user is x, the one line of output picture image written into the second memory 2 may include m·x words. Further assume that when the value of m·x is not an integer, it is made an integer by either raising or neglecting the decimal part thereof. When the mode is MODE 2, a comparator 415 receives as a first input the count of a counter 416 for counting the basic clock and receives as a second input the above-mentioned value m·x so that the comparator 415 produces a "1" output from its "=" terminal when the comparison indicates coincidence therebetween. The counter 416 is cleared by an output signal which is a delayed version of this "1" output of the comparator 415 delayed by a predetermined value by a delay circuit 902. The "1" output of the comparator 415 is provided as a clock to the shift register 509 through an AND gate 423 and subsequent OR gate. Thus, the shift register 509 is shifted by one bit and held in this state until it is next shifted, i.e., for the time necessary for writing one line of output picture image.

Assuming that the output of the shift register 509 is "1" at the point of time when the mode is changed to MODE 2, the clock pulse 301 may be inputted to the terminal b of the address designating circuit 504 through the AND circuits 413 and 412 and an OR circuit 424. The address designating circuit 504 sends out the address designating signal g, the content of which increases by one (1) every time the clock pulse 301 is inputted to the terminal b, to the second page memory 2. It is to be noted that this clock pulse b has not been thinned. The "0" signal held in a register 426 is inputted to the second page memory 2 through the AND circuit 414 and an OR circuit 425 and the "0" is stored in the address designated by the address designating signal g.

Figure 4:
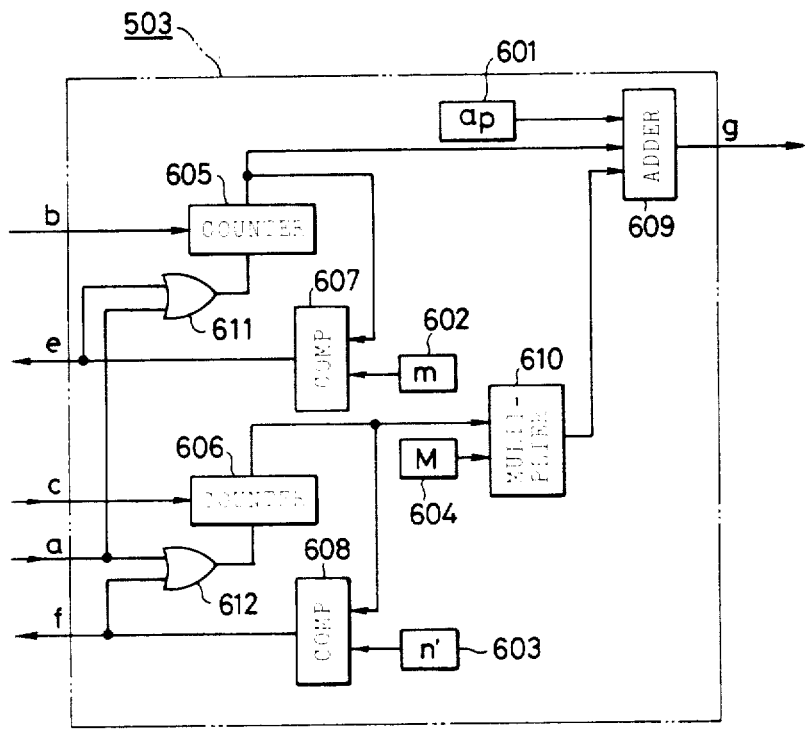
FIGS. 4 and 5 are block diagrams illustrating in detail the address designating circuits 503 and 504, respectively, of FIG. 2.
Figure 5:
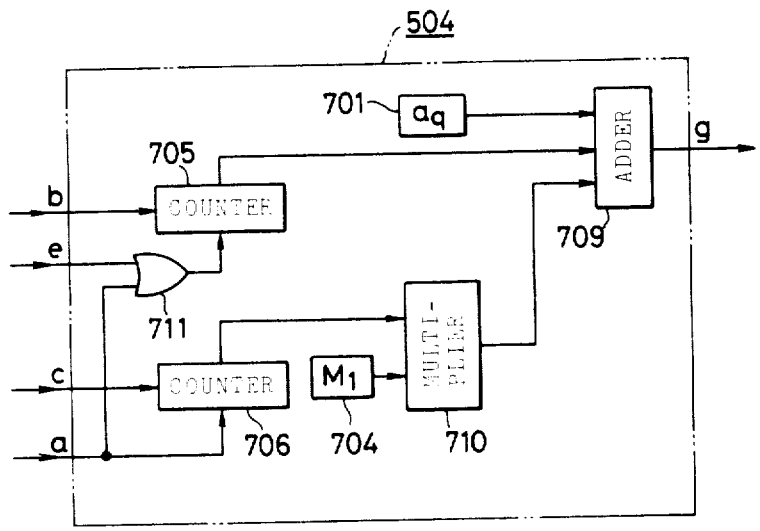

When the number of the clock pulses 301 becomes equal to the value m·x and the comparator 415 produces a pulse from its "=" terminal, the address designating signal g returns to the first address since the counter 605 (FIG. 4) of the address designating circuit 504 is reset. That is, a number of "0"s in accordance with the given magnifying factor x are inputted into the second page memory 2. Accordingly, when the mode is switched to MODE 2, a signal of successive "0"s of one line of output picture image is stored. That is, the picture image is multiplied by x in the main scanning direction.

A counter 417 and a comparator 418 serve to control the number of times that an output signal will be generated from the comparator 415. The counter 417 counts the number of signals produced from the comparator 415 and comparator 418 generates a signal $\theta$ for stopping the zero writing into the second page memory 2 when the count of the counter 417 reaches X (X being the multiplying factor when first enlarging processing and being integer).

Until the count of the counter 417 becomes X, the comparator 418 produces a "1" output from its "$\neq$" output and the gate of the AND circuit 520 is in its open state. Therefore, the pulse signal produced from the "=" terminal of the comparator 415 every time one line is completed is inputted in the terminal c of the address designating circuit 504 through the AND circuits 516, 520 and 521. As a result, the address designating signal g designates addresses advanced by one in the subscanning direction. This operation is repeated until the count of the counter 417 reaches X. By the above-mentioned operations, the picture image is multiplied by a given magnifying factor, that is by x.

When the signal $\theta$ is produced from the comparator 418, the flip-flop 409 is reset and the flip-flop 410 is set, so that the mode is returned to the MODE 1 from MODE 2. At this time, the zero writing operation into the second page memory 2 is completed.

In the case where a non-zero word is detected in the comparator 405 in MODE 1 (checking mode), the signal $\alpha$ becomes "1" at that time. As a result, the clock pulse 301 is allowed to pass through the AND circuit 426 to set a flip-flop 419 so that the mode is changed to MODE 3 (enlarging/reducing mode). The operation in this mode is exactly the same as in the conventional system as described with respect to FIG. 2 and this mode is held during the processing of k lines of input picture image. The maximum value of k is determined in accordance with an original document.

A counter 420 and a comparator 421 serve to hold the mode in this MODE 3 during the processing of k lines of input picture image. That is, the counter 420 counts the number of processed lines of input picture image and the comparator 421 produces its output $\beta$ when the count of the counter 420 reaches k. In response to this output $\beta$, the flip-flop 419 is reset and the flip-flop 410 is set. Thus, the mode returns to MODE 1 (checking mode) from MODE 3 (enlarging/reducing mode).

Although the mode is changed to MODE 3 when a "1" is detected during the judging operation in the comparator 405 as already described, it is necessary to adjust the address such that the address designated by the address designating circuit 503 for the page memory 1 returns at this time to the starting point of the line which is now being read by the register 404. To this end, it is necessary to reset only the counter 605 in the address designating circuit 503 when the mode changes to MODE 3. The configuration of the address designating circuit 503 is the same as that in FIG. 4 except for the above-mentioned point.

Figure 10:
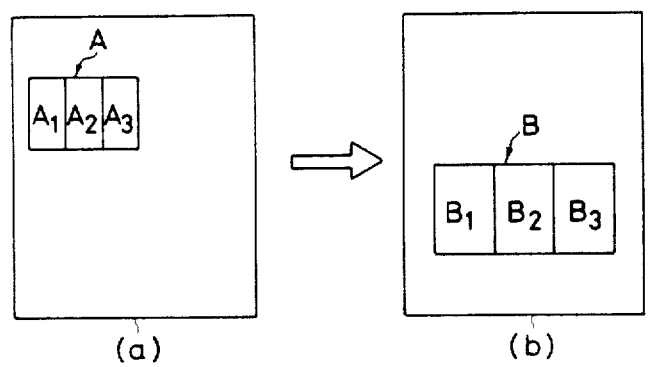
FIG. 10 is a diagram for explaining a variation in the operation of the system for enlarging a picture image according to the present invention.

Although the above-mentioned embodiment has been described such that the mode is changed to MODE 2 when the one line of bits are determined to be all-zero in the all-zero judging process, the present invention is of course not restricted to this. For example, when the picture image in the extracting area A on an original document a is enlarged by multiplying by a given magnifying factor x to obtain a desired copy picture image b as shown in FIG. 10, the extracting area may be divided into n (n being integer) parts so as to successively achieve the above-mentioned enlarging operation with a magnifying factor x with respect to each of the divided parts of the extracting area. In the example case of FIG. 10 where n=3, the extracting area $A_1$ may first be subjected to enlarging processing to obtain the copy picture image $B_1$, the extracting area $A_2$ may then be subjected to enlarging processing to obtain the copy picture image $B_2$ and the extracting area $A_3$ may lastly be subjected to enlarging processing to obtain the copy picture image $B_3$.

In this case, it is apparent that the mode is switched to MODE 2 when the all-zero judgment in the all-zero judging process indicates all-zero with respect to 1/n of words of one line. Further, there is an advantage that the copy is speeded up in the case where the extracting area is divided, in comparison with the case where the extracting area is not divided, because the frequency of occurrence of a "1" in the all-zero judging process decreases.

It will now be explained why no moire stripe occurs even if a short correction coefficient is used in accordance with the present invention. As is apparent from the description of the operation of FIG. 9, when judgment indicates that one line or 1/n of a line is all-zero, the mode is switched to MODE 2 during which no shift signal is inputted into the shift register 508. That is, in MODE 2 the correction coefficient $\alpha$ stored in the register 508 is not used. As is well known, the frequency of occurrence of moire stripe increases when the application of correction coefficient $\alpha$ has any regularity. For this reason, the regularity of the correction coefficient $\alpha$ has heretofore been prevented by increasing the number of bits of the correction coefficient $\alpha$ in the conventional technique. However, since the correction coefficient $\alpha$ is irregularly applied according to the present invention, no moire stripe occurs even if the number of bits of the correction coefficient is small.

Figure 11A:
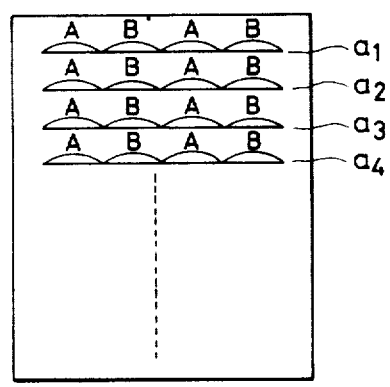
FIGS. 11(a) and 11(b) are diagrams for comparing the respective copy picture images according to the conventional technique and the present invention for explaining the application of correction coefficient.
Figure 11B:
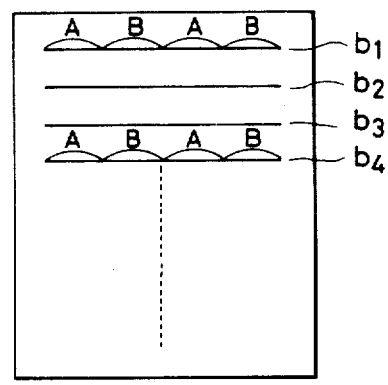

The reason for this will be described in more detail. In the case where the correction coefficient $\alpha$ is composed of the patterns A and B as described above with respect to the conventional technique, the correction coefficient $\alpha$ is applied to all the extracting area of an original document in the conventional case. Assuming now that the copy picture image obtained by enlarging the extracting area with a multiplying factor x according to the conventional technique is shown in FIG. 11(a), the correction coefficient $\alpha(=AB)$ applied to the respective lines $a_1, a_2, a_3, a_4, \ldots$ of the copy picture image is, for example, as shown in the same drawing, FIG. 11(a). Assuming, on the other hand, that the copy picture image according to the present invention is shown in FIG. 11(b) and each of the lines $b_2$ and $b_3$ is all-zero, the correction coefficient $\alpha$ is not applied to the lines $b_2$ and $b_3$ as described above. Thus, the correction coefficient $\alpha$ (= AB) applied for the respective lines $b_1$, $b_2$, $b_3$, $b_4$, . . . is, for example, as shown in the drawing, FIG. 11(b).

As is apparent when comparison is made between the copy picture images of FIGS. 11(a) and 11(b), the correction coefficient $\alpha$ is irregularly applied in the copy picture image according to the embodiment of the invention. That is, in the embodiment according to the present invention, it is possible to have the same effect as that according to the conventional technique with the correction coefficient of the small number of bits. Further, in the system in which copying is achieved by dividing the extracting and copying areas into n parts as shown in FIG. 10, it is apparent that the application of the correction coefficient $\alpha$ is more irregular so that a moire stripe can be prevented from occurring even with a correction coefficient having a smaller number of bits.

As described above, according to the present invention, since the enlarging/reducing process is not applied, contrary to the conventional case, when one line or 1/n line is all-zero, there is an advantage that the processing is speeded up and therefore the processing time is reduced. There is a further advantage that a moire stripe can be prevented from occurring even if a correction coefficient includes a small number of bits.

I claim:

1. A picture image magnification system for magnifying (i.e. enlarging or reducing), by a desired magnifying factor, an original picture image comprising a plurality of picture elements arrayed in n rows of at least m elements each, where m and n are positive integers, said system having means for generating a plurality of signals corresponding to said picture elements with each signal having a plurality of possible values including a zero value, said system further comprising:
   judging means for monitoring said signals and providing an all-zero detection output when a predetermined number of consecutive ones of said signals all have zero values; and
   processing means for, in the absence of said all-zero detection output, enlarging by a first magnifying factor a portion of said original picture image represented by said predetermined number of consecutive signals and subsequently reducing said portion by a second magnifying factor different from said first magnifying factor in order to obtain a copy image corresponding to said original picture image magnified by said desired magnifying factor, said processing means in response to said all-zero detection output magnifying said portion of said original picture image directly by said desired magnifying factor.

2. A picture image magnification system as claimed in claim 1, wherein said first magnifying factor is equal to the sum of a predetermined natural number and the integer part of said desired magnifying factor, and wherein said second magnifying factor is a correction coefficient equal to the ratio of said desired magnifying factor to said first magnifying factor.

3. A picture image magnification system as claimed in claim 2, wherein said processing means includes a memory (2) for storing signals of said copy image corresponding to said original picture image magnified by said desired magnifying factor, said memory having address and data inputs and storing signals at said data input at locations defined by addresses at said address input, said processing means further including a first register (506) for storing signals which have been successively magnified by said first and second magnifying factors, a second register (426) for storing zero-values signals, and selection means for selectively coupling said second register to said data input in response to said all-zero detection output.

4. A picture image magnification system as claimed in claim 1, wherein said predetermined number is equal to m.

5. A picture image magnification system as claimed in claim 1, wherein said predetermined number is an integer less than m.

6. A picture image magnification system as claimed in claim 1, further comprising inhibiting means (e.g. 420, 421) for maintaining said processing means in a first mode of operation (MODE 3) for a duration required for the processing of signals corresponding to a plurality of rows of said picture element after a non-zero value is detected in at least one of said predetermined number of consecutive signals.

7. A picture image magnification system as claimed in claim 3, wherein said processing means further comprises address generating means (504) responsive to a clock signal for generating sequential addresses to be provided to said address input of said memory, said processing means further comprising means for providing a first clock signal as said address clock during said first mode of operation and for providing a second clock signal as said address clock during said second mode of operation.

8. A picture image magnification system as claimed in claim 2, wherein said correction coefficient has a finite length reduced in accordance with the frequency of occurrence of said all-zero detection output signal so that a moire strip is prevented by said correction coefficient.

* * * * *